(No Model.)

F. T. DAVIS.
CHECK HOOK FOR HARNESS.

No. 331,040. Patented Nov. 24, 1885.

WITNESSES:

INVENTOR:
F. T. Davis
BY Munn & Co.
ATTORNEYS.

UNITED STATES PATENT OFFICE.

FRANKLIN T. DAVIS, OF MOUNT VERNON, NEW YORK.

CHECK-HOOK FOR HARNESS.

SPECIFICATION forming part of Letters Patent No. 331,040, dated November 24, 1885.

Application filed April 15, 1885. Serial No. 162,357. (No model.)

*To all whom it may concern:*

Be it known that I, FRANKLIN T. DAVIS, of Mount Vernon, in the county of Westchester and State of New York, have invented a new and Improved Check-Hook for Harness, of which the following is a full, clear, and exact description.

My invention consists of a hinged or jointed check-hook combined with a spring that closes the hook for retaining the check-rein, and permits the hook to yield when the horse bears on the check-rein or bit.

Reference is to be had to the accompanying drawings, forming part of this specification, in which similar letters of reference indicate corresponding parts in all the figures.

Figure 1:
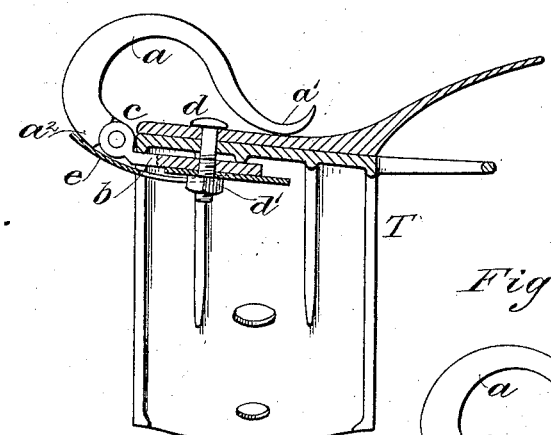
Figure 3:
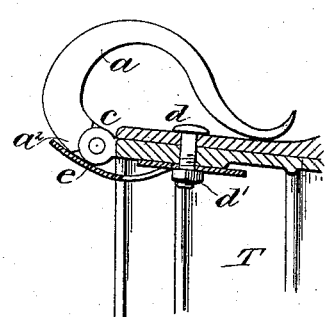
Figure 2:
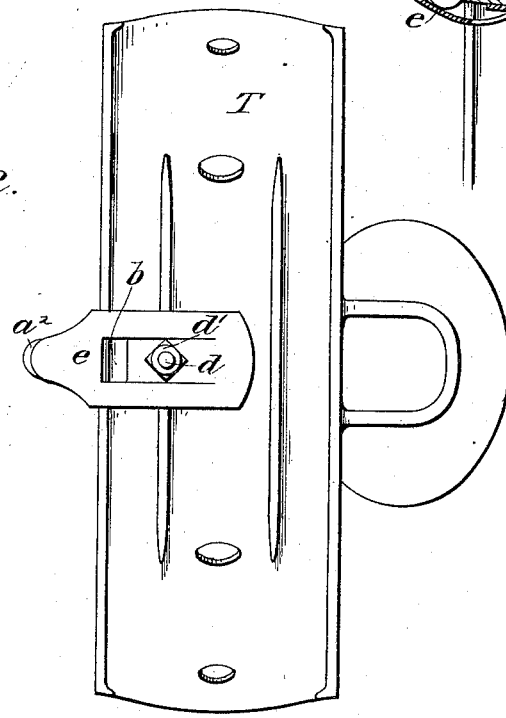

Figure 1 is a sectional elevation of a harness saddle-tree having my invention applied thereto. Fig. 2 is an inverted plan view of the same, and Fig. 3 shows a modification.

My new check-hook is composed of the hook portion $a$ and lower plate, $b$. These are pivoted or hinged together at $c$, and are attached to the saddle-tree T by the bolt and nut $d\ d'$, that passes through the tree and plate $b$, as shown clearly in Fig. 1.

For holding the end $a'$ of the hook $a$ normally down in contact with the tree T, I employ a spring, $e$, that presses against the heel $a^2$ of the hook $a$ in front of the joint or hinge $c$, as shown in Fig. 1. The spring $e$ in this instance is held in place by the same bolt and nut $d\ d'$ that secures the plate $b$ to the tree T. If desired, the hook $a$ may be hinged directly to the tree, as shown in Fig. 3, and dispense with plate $b$; but by using plate $b$ my new hook may be attached to any common saddle-tree now made or in use.

By hinging the hook $a$ and using a spring for holding it closed the hook will retain the check-rein without danger of the horse becoming accidentally unchecked, and owing to the hinge and spring, in case the horse bears heavily or suddenly upon the bit and check-rein, there will be no danger of breaking either, as they are not rigidly held, as with ordinary check-hooks, and owing to the yielding action of the hook the bit is more comfortable to the horse, and he will not fret, as with ordinary rigid check-hooks.

Having thus described my invention, I claim as new and desire to secure by Letters Patent—

The hook $a$, hinged to the plate $b$, in combination with the spring $e$, arranged to press upon the heel $a^2$ of the hook, substantially as and for the purposes described.

FRANKLIN T. DAVIS.

Witnesses:
GEO. H. CAMERON,
BURR DAVIS.